United States Patent Office 3,453,108

Patented July 1, 1969

3,453,108

PHOTOCHEMICAL CROSS-LINKING OF POLYMERS

Gerard Albert Delzenne and Urbain Leopold Laridon, Wilrijk-Antwerp, Belgium, assignors to Gevaert-Agfa N.V., Mortsel, Belgium, a Belgian company No Drawing. Filed June 14, 1965, Ser. No. 463,913
Claims priority, application Great Britain, Apr. 13, 1965, 15,810/65
Int. Cl. G03c 1/54, 1/56, 1/70
U.S. Cl. 96—35.1 6 Claims

ABSTRACT OF THE DISCLOSURE

The disclosed light-sentitive compositions contain a soluble, polymeric material carrying azidosulphonyl substituents and activating groups chemically related to the activating dyes, e.g., the pyrazoline dyes, as well as groups such as hydroxyl groups that are reactive with the intermediates derived from the photochemical decomposition of azidosulphonyl groups. Alternatively, the light-sensitive compositions can comprise a mixture of a reactive group-containing polymer and another polymer-containing azidosulphonyl substituents and activating groups. These light-sensitive compositions are especially suitable for use in recording processes wherein insolubilization of the polymeric material takes place upon exposure to a pattern of actinic light corresponding to the matter to be recorded.

The present invention relates to a process for the photochemical insolubilization of polymers, to a method for the production of printing plates and photographic resists, and to printing plates and photographic resists obtained by this process.

In the U.K. patent application No. 24,760/64 a process is described for the photochemical insolubilization of polymers, which comprises exposing to actinic light a photosensitive composition consisting essentially of a soluble polymeric material carrying (A) groups that are reactive with intermediates deriving from the photochemical decomposition of azidosulphonyl groups and (B) azidosulphonyl substituents. As described in the above-mentioned application the polymeric material carrying both reactive groups and azidosulphonyl substituents may be a chemically modified natural polymer or a synthetic polymerization, polycondensation or polyaddition product.

The light-sensitive polymers are exposed to actinic light so that a cross-linking reaction between the reactive groups and the photochemical decomposition products of the azidosulphonyl substituents is initiated.

In order to obtain the optimum degree of insolubilization and a much faster reaction, it is known to expose the light-sensitive polymers to actinic light in the presence of catalytic amounts of activating dyes. A large number of these activating dyes is known, comprising for instance Michler's ketone and analogues, certain naphthothiazolines and pyrazolines, and the like.

It has now been found that the photochemical insolubilization rate of light-sensitive polymers carrying both reactive groups and azidosulphonyl substituents, such as described in the U.K. patent application No. 24,760/64, can be further increased when said light-sensitive polymers comprise also activating groups that are chemically bound on the polymeric chain.

The process for the photochemical insolubilization of polymers according to the invention comprises exposing to actinic light a light-sensitive composition consisting essentially of a soluble, polymeric material carrying (A) groups that are reactive with intermediates deriving from the photochemical decomposition of azidosulphonyl groups; (B) azidosulphonyl substituents; and (C) activating groups.

It was surprising to note that the increase of insolubilization rate of the light-sensitive material (such as is generally obtained by the addition to light-sensitive compositions of an activating compound) could also be observed by chemically binding the activating group to the polymeric chain.

The polymeric materials carrying reactive groups, azidosulphonyl substituents and activating groups may be chemically modified natural polymers or synthetic polymerization, polycondensation or polyaddition products of the same classes as described in the above-mentioned U.K. patent application No. 24,760/64. The sole difference with the polymers therein described is that the light-sensitive polymeric materials of the present invention in addition comprise activating groups, which are chemically bound to the polymeric chain.

Of course the insolubilization rate of photosensitive polymeric material will be dependent on the relative amount of activating groups, which are implanted on the polymeric chain, relative being meant with respect to the number of reactive groups and of azidosulphonyl substituents the polymeric material comprises in the same time.

This method makes it possible to control the sensitizing activity of the activating substituents by fixing them in the immediate neighborhood of the azidosulphonyl groups and takes advantage of the diffusionless character of those chemically bound sensitizers to maintain a better sensitizing activity over a longer period of time.

As described in the U.K. patent application No. 24,760/64, the soluble polymeric material carries groups that are reactive with intermediates derived from the photochemical decomposition of azidosulphonyl substituents. Among the reactive groups are especially of value hydroxyl groups, pyridine groups, phenyl groups, lactam groups, and the like. It is just some of these reactive groups that enable also the chemical bonding of known activating compounds to the polymeric material. When the known activating compounds possess radicals, which are reactive with the above-mentioned hydroxyl groups, and the like, they can be chemically bound to the polymeric chain by fully known reaction methods. This is, for instance, the case when the activating compounds possess chlorocarbonyl groups, chlorosulphonyl groups, isocyanate groups, and the like.

According to a special embodiment of the invention, the groups that are reactive with intermediates deriving from the photochemical decomposition of azidosulphonyl groups are substituted on one polymeric material whereas the azidosulphonyl substituents and the activating groups are substituted on another polymeric material. In this case the photosensitive composition is constituted by a mixture of both polymeric materials.

The photosensitive composition of the invention consists at least partially of the soluble polymeric material carrying reactive groups, azidosulphonyl substituents and activating groups, or the photosensitive composition consists at least partially of a mixture of polymers of which one carries the reactive groups and the other the azidosulphonyl substituents and the activating groups. Moreover the photosensitive composition may comprise other polymers, plasticizers, extenders, and the like.

The polymeric materials may be exposed to actinic light from any source and of any type. The light source should preferably, although not necessarily, furnish an effective amount of ultraviolet radiation. Suitable sources of light include carbon arcs, mercury vapor lamps, fluorescent lamps, argon glow lamps, photographic flood lamps and tungsten lamps.

For initiating the photochemical cross-linking by means of the azidosulphonyl substituents a very strong light source is not needed. Indeed, in the example described hereinafter, a 80 watt Philips mercury vapor lamp, placed at a distance of about 15 cm. of the surface to be rendered insoluble, is used. Brighter light sources are generally not needed since at these relatively low light intensities the photochemically cross-linking influence of the azidosulphonyl substituents is found to be strong enough.

The photosensitive polymeric material may be used in forming plates and films wholly made of the photosensitive polymeric material. They may also be coated by known processes as a layer on any base. After drying, the photosensitive plate or coating is exposed to actinic light rays just as described in the U.K. patent application No. 24,760/64, whereby the exposed areas become insoluble.

If the photosensitive polymeric material is water-soluble, water may be used as solvent in coating the support. On the contrary, if photosensitive polymeric materials insoluble in water are used, organic solvents, mixtures of organic solvents or mixtures of organic solvents and water may be used. E.g. when using mixtures of polymers bearing azidosulphonyl substituents with water-soluble colloids such as poly(N-vinylpyrrolidone), warm or cold water can be used as developer.

The plates formed wholly of or coated with the photosensitive polymeric material are useful in photography, photomechanical reproductions, lithography and intaglio printing. More specific examples of such uses are, offset printing, silk screen printing, duplicating pads, manifold stencil sheeting coatings, lithographic plates, relief plates, and gravure plates. The term "printing plates" as used in the claims is inclusive of all of these.

A specific application of the invention is illustrated by a typical preparation of a pirnting plate. In this application, a plate, usually of metal, is coated with a film of the photosensitive composition. When the plate is not of metal it may consist wholly of the photosensitive composition or it may be coated with a layer thereof. In all these cases the surface of the plate is then exposed to light through a contacted process transparency, e.g., a process positive or negative (consisting solely of opaque and transparent areas and where the opaque areas are of the same optical density, the so-called line or half-tone negative or positive). The light induces the reaction, which insolubilizes the areas of the surface beneath the transparent portions of the image, whereas the areas beneath the opaque portions of the image remain soluble. The soluble areas of the surface are then removed by a developer, and the remaining insoluble, raised portions of the film can serve as a resist image, whereas the exposed base material is etched, forming a relief plate, or the plate can be inked and used as a relief printing plate directly in the customary manner.

The photosensitive polymeric materials are suitable for other purpose in addition to the printing uses described above, e.g., as ornamental plaques or for producing ornamental effects, as patterns for automatic engraving machines, foundry molds, cutting and stamping dies, name stamps, relief maps for braille, as rapid cure coatings, e.g., on film base, as sound tracks on film, for embossing plates, paper, e.g., with a die prepared from the photopolymerizable compositions, in the preparation of printed circuits, and in the preparation of other plastic articles.

The following example illustrates the present invention.

EXAMPLE 2.8 g. of polyether, obtained by the polycondensation of 2,2-bis(4-hydroxyphenyl)-propane and epichlorohydrin, are dissolved in a mixture of 20 cc. of methylene chloride and 1 cc. of pyridine. To this solution is added 0.28 g. of 1-p-chloro-carbonylphenyl-3-phenyl-$\Delta^2$-pyrazoline, whereupon the reaction mixture is allowed to stand for 48 h. in the dark at room temperature. Then the reaction mixture is diluted with 50 ml. of methylene chloride, filtered and poured in methanol. The precipitated flaky product is collected and dired under reduce pressure. Yield, 3 g. of modified polyether comprising units of the formulae:

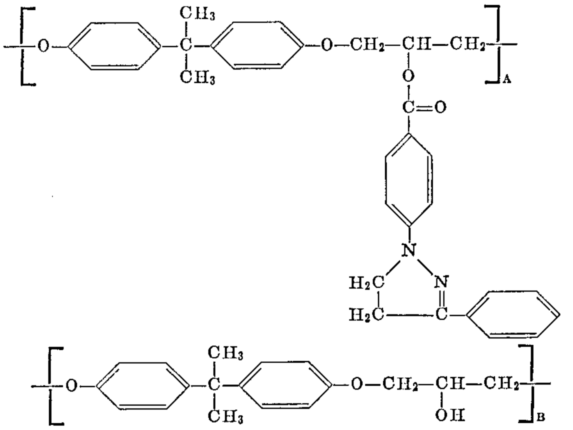

wherein

A=4.5%
b=95.5%

1.4 g. of this polymer is dissolved in a mixture of 15 cc. of methylene chloride and 1 cc. of pyridine and then 0.62 g. of m-azidosulphonylbenzoyl chloride is added. The reaction mixture is allowed to stand for 24 h. at room temperature in the dark, whereupon it is diluted with 50 cc. of methylene chloride, filtered and poured under reduced pressure. Yield: 1 g. of modified polyether comprising units of the formulae:

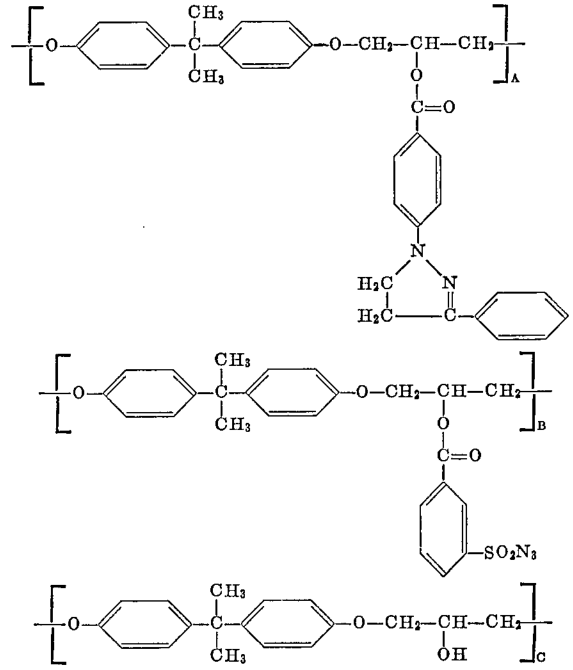

wherein

A=4.5%
B=5.5%
C=90%

0.025 g. of the above modified polyether is dissolved in 2 cc. of a mixture of 1 cc. methylene chloride and 1 cc. of sym.-tetrachloroethane. The solution formed is coated onto an aluminum foil in such a way that after drying, a layer of approximately 1$\mu$ is obtained. Said layer is exposed through a halftone negative by means of an 80 watt mercury vapor lamp placed at a distance of 15 cm. After exposure, the layer is washed with a mixture of equal parts of methylene chloride and sym.-tetrachloroethane, whereby the unexposed parts are washed away. In order to obtain a good image, an exposure time of 4 minutes is required. If a layer of a modified polyether of the same substitution degree with respect to the azidosulphonyl and the hydroxyl groups but without pyrazoline groups, should be illuminated with the same 80 watt mercury vapor lamp, an exposure time of 30 minutes would be needed in order to obtain a good image.

We claim:

1. Process for the photochemical insolubilization of polymers which comprises exposing to actinic light a light-sensitive composition comprising a soluble, polymeric material carrying (A) groups that are reactive with intermediates derived from the photochemical decomposition of azidosulphonyl groups, (B) azidosulphonyl substituents, and (C) pyrazolino groups.

2. Process for the photochemical insolubilization of polymers which comprises exposing to actinic light a light-sensitive composition comprising a mixture of (A) a soluble polymeric material carrying groups that are reactive with intermediates derived from the photochemical decomposition of azidosulphonyl groups, and (B) a soluble polymeric material carrying azidosulphonyl substituents and pyrazolino groups.

3. Process according to claim 1 wherein the said polymeric material comprises the reaction product of (A) a polyether derived from the condensation of 2,2-bis(4-hydroxyphenyl)propane and epichlorohydrin, (B) 1-p-chlorocarbonylphenyl-3-phenyl-$\Delta^2$-pyrazoline, and (C) m-azidosulphonylbenzoyl chloride.

4. A light-sensitive composition which comprises a material selected from the group consisting of (1) a polymeric material carrying (A) groups that are reactive with intermediates derived from the photochemical decomposition of azidosulphonyl groups, (B) azidosulphonyl substituents, and (C) pyrazolino groups; and (2) a mixture of (A) a soluble polymeric material carrying groups that are reactive with intermediates derived from the photochemical decomposition of azidosulphonyl groups, and (B) a soluble polymeric material carrying azidosulphonyl substituents and pyrazolino groups.

5. A light-sensitive composition according to claim 4 comprising the reaction product of (A) a polyether derived from the condensation of 2,2-bis(4-hydroxyphenyl)propane and epichlorohydrin; (B) 1-p-chlorocarbonylphenyl-3-phenyl-$\Delta^2$-pyrazoline; and (C) m-azidosulphonylbenzoyl chloride.

6. A recording process wherein a recording material comprising a layer comprising a light-sensitive polymeric composition according to claim 4 is exposed to a pattern of actinic light representing matter to be recorded such that over the areas of said layer differential insolubilization takes place.

References Cited

UNITED STATES PATENTS

| | | | |
|---|---|---|---|
| 2,948,610 | 8/1960 | Merrill et al. | 96—33 |
| 3,058,944 | 10/1962 | Breslow et al. | 260—41 |
| 3,143,423 | 8/1964 | Reynolds et al. | 96—91 |
| 3,203,936 | 8/1965 | Breslow et al. | 260—79.3 |
| 3,261,785 | 7/1966 | Robinson | 260—2.5 |
| 3,278,305 | 10/1966 | Laridon et al | 96—35.1 |
| 3,301,841 | 1/1967 | Burleigh et al. | 260—94.4 |
| 3,345,171 | 10/1967 | Laridon et al. | 96—36 |

NORMAN G. TORCHIN, *Primary Examiner.*

RONALD H. SMITH, *Assistant Examiner.*

U.S. Cl. X.R.

96—91, 115; 204—159.14; 260—79.3, 349